June 11, 1968 G. R. DUNCAN ET AL 3,388,239

ADDER

Filed Dec. 2, 1965 2 Sheets-Sheet 1

INVENTORS
GLEN R. DUNCAN
WILLIAM H. WERTZ

BY

Ernest L. Brown
ATTORNEY

ADDER

INVENTORS
GLEN R. DUNCAN
WILLIAM H. WERTZ

BY
Ernest L. Brown
ATTORNEY

United States Patent Office 3,388,239
Patented June 11, 1968

3,388,239
ADDER

Glen R. Duncan and William H. Wertz, Canoga Park, Calif., assignors to Litton Systems, Inc., Beverly Hills, Calif.

Filed Dec. 2, 1965, Ser. No. 511,207
18 Claims. (Cl. 235—175)

ABSTRACT OF THE DISCLOSURE

A combination of logical circuits which is adapted to be controlled to generate an arithmetic sum or its complement, the complement of the logical product, the logical sum, or the non-equivalence function of two binary digital number, using interconnected inverting gates.

This invention pertains to a binary-digital circuit which may be controlled to generate an arithmetic sum or its complement, the complement of the logical product, the logical sum, or the non-equivalence function of two binary digital numbers.

The device of this invention has, assigned to each bit of the numbers to be operated upon, five inverting (NOR/NAND) gates which are interconnected in a fashion to generate an arithmetic sum of two binary numbers by a process of parallel addition, which has a very fast carry, at a very low cost. The same circuitry used for the parallel addition is also wired and adapted to generate signals representing the complement of the logical product of two numbers, the logical sum of two numbers, or the non-equivalence function of two binary numbers.

Whether the combination of circuits generates an arithmetic sum or its complement, the complement of the logical product, the logical sum, or the non-equivalence function of two binary digital numbers depends upon the state of three binary control signals.

When operating as a parallel adder, adjacent circuits corresponding to particular bit orders of the numbers to be operated upon, or operands, generate output signals and carry signals which, as one moves along the sequence of circuits, alternate between direct arithmetic and complementary arithmetic.

It is therefore an object of this invention to generate signals which are measures of the arithmetic sum of two binary numbers.

It is also an object of this invention to generate signals in parallel which are a measure of the arithmetic sum of two binary numbers.

It is also an object of this invention to generate signals which are measures of the complement of the logical product of two binary numbers.

It is also an object of this invention to generate signals which are measures of the logical sum of two binary numbers.

It is another object of this invention to generate signals which are measures of the non-equivalence function of two binary numbers.

It is a more specific object of this invention to provide apparatus which is adapted to achieve the above enumerated objects.

It is still a more specific object of this invention to achieve the above enumerated objects selectively in response to control signals.

Figure 1:
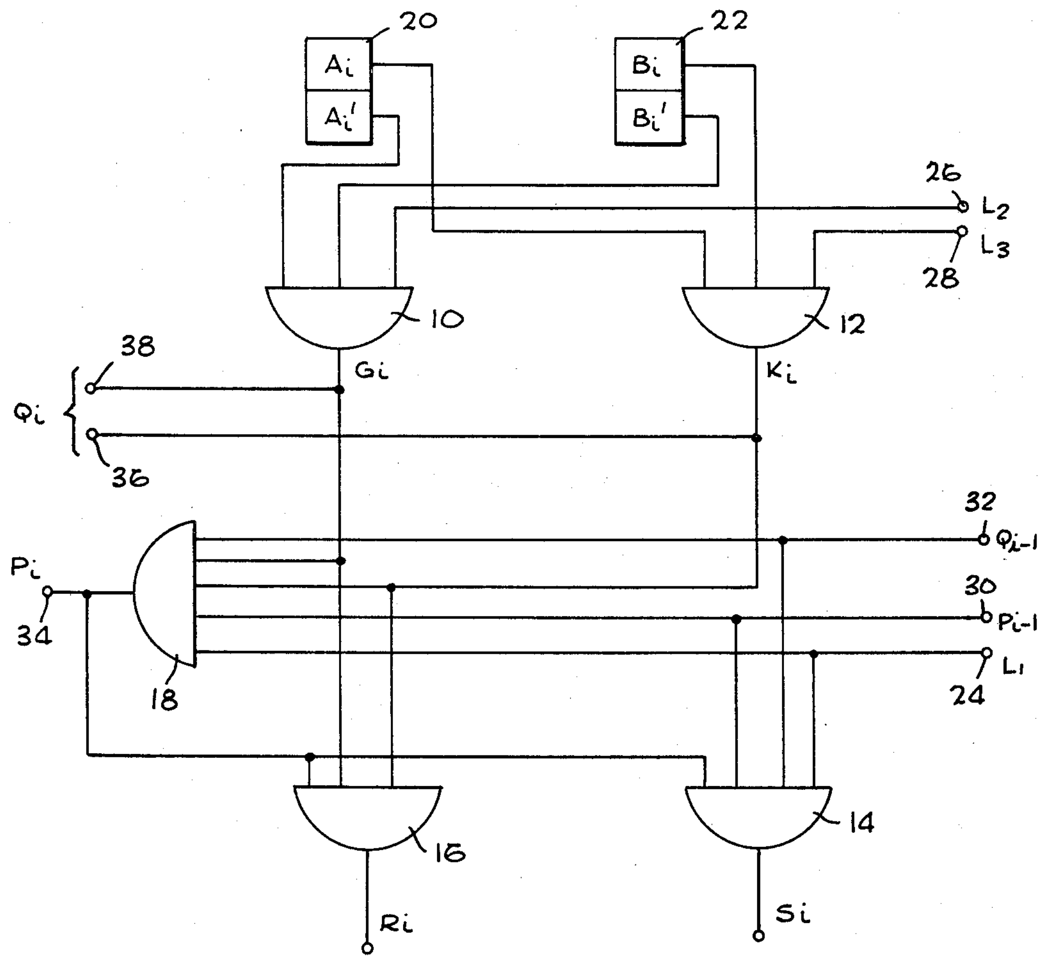
Figure 2:
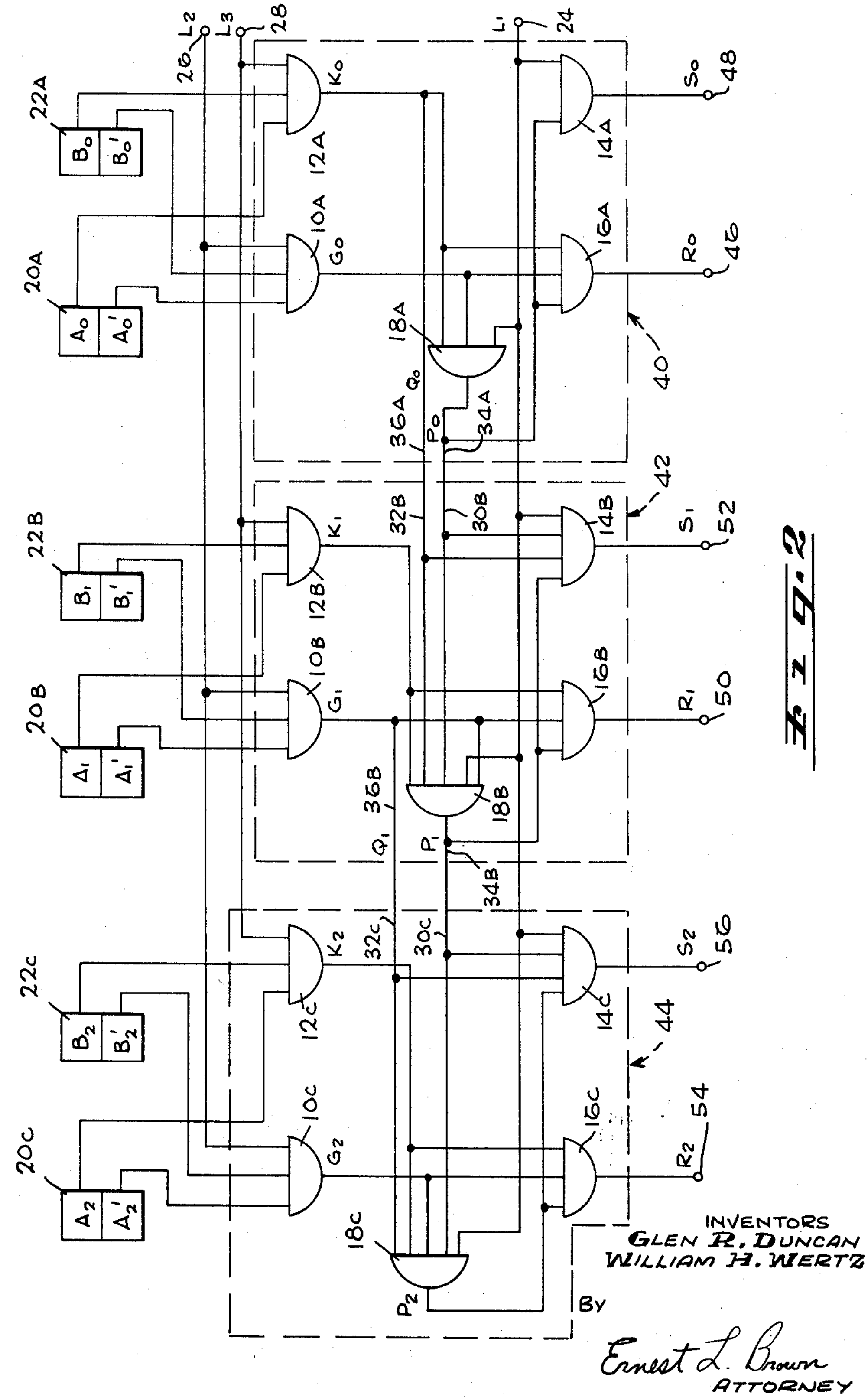

Other objects will become apparent from the following description, taken in connection with the accompanying drawings in which:

FIGURE 1 is a block diagram of a typical circut of this invention, adapted to service one bit of a multi-bit operation; and FIGURE 2 shows the circuit of FIGURE 1 combined into a 3-bit device to demonstrate the operation of the device of this invention.

It is to be understood that the circuitry of a NOR and a NAND gate may be the same. Whether such an inverting gate is a NOR or NAND gate depends upon the logic of the system. For example, if a high signal is designated a "one," the presence of a "one" at any input terminal of the gate produces a "zero" at the output terminal and the gate is called a NOR gate. If a low signal is designated as a "one," the presence of "ones" at all input terminals of the gate is needed to produce a "zero" at the output terminal and the gate is called a NAND gate.

Referring to FIGURE 1, inverting gates 10, 12, 14, 16 and 18 are each adapted to generate an output signal when no signal appears at its input terminal. Two flip-flops 20 and 22 (and each of which are usually part of a larger register) are adapted to generate signals representing one bit and its complement of each of two operands, an addend and an augend. The signals representing the bit of the addend and the bit of the augend are each connected to different inputs of inverting gate 12, while the signals representing the complements of the bit of the addend and the bit of the augend are each connected to different inputs of the inverting gate 10. Control terminals 24, 26 and 28 are adapted to receive control signals for controlling the kind of operation to be performed by the device of FIGURE 1. The first control terminal 24 is connected to a separate input terminal of inverting gates 14 and 18. The second input terminal 26 is connected to a separate input terminal of inverting gate 10. The third input terminal 28 is connected to a separate input terminal of inverting gate 12.

The input terminals 30 and 32 are adapted to receive carry signals from circuits representing lower order bits. Each of the carry input terminals 30 and 32 are connected to different input terminals of gate 14 and gate 18.

The carry output terminals are terminals 34 and either terminal 36 or terminal 38, depending upon whether it is desired to transfer a carry bit or its complement.

The output terminal of gate 10 is connected to separate input terminals of gates 16 and 18 and to terminal 38. The output terminal of gate 12 is connected to separate input terminals of gates 16 and 18 and to output terminal 36. The output terminal of gate 18 is connected to separate input terminals of gates 14 and 16 and to output terminal 34.

FIGURE 2 shows three circuits similar to FIGURE 1, connected to handle logical operations involving two 3-bit numerals. The circuit 40 is adapted to operate upon the lowest order bit, the circuit 44 is adapted to operate upon the highest order bit, and the circuit 42 is adapted to operate upon the intermediate order bit. Like numbers to that used in FIGURE 1 are used in FIGURE 2 with the letters A, B, C appended to show that the parts pertain to circuit 40, 42, or 44, respectively. Flip-flops 20A, 20B and 20C form a 3-bit register adapted to be set in accordance with the 3 bits of an addend. Flip-flops 22A, 22B and 22C form a 3-bit register adapted to receive the 3 bits of an augend. The same control lines 24, 26 and 28 are connected to each of the circuits 40, 42 and 44 to control the same.

It is apparent that other signal generating means than flip-flops could be used to generate the operand signals. The flip-flops 20A, 20B and 20C are shown by way of example only.

Referring again to FIGURE 1, the adder stage shown therein utilizes as inputs operand terms ($A_i$, $A_i'$, $B_i$, $B_i'$), carry terms ($P_{i-1}$, $Q_{i-1}$) from the preceding stage, and logic control terms ($L_1$, $L_2$, $L_3$) which are common to all stages. The shown stage generates, in the two gates 16 and 14, signals $R_i$ and $S_i$ which, in the arithmetic addition operation are either the arithmetic sum of the two operands $A_i$ and $B_i$, or the complement of the arithmetic sum of the two operands $A_i$ and $B_i$, depending on whether the input carry terms ($P_{i-1}$, $Q_{i-1}$) correspond to the complement of the carry from the preceding stage or measures of the carry from the preceding stage, respectively. The shown stage also generates, in the arithmetic addition mode of operation, for use in the higher order stages, signals which correspond to the carry output terms $P_i$ and either $G_i$ or $K_i$.

The signals representing the carry output terms are, selectively, measures of the carry or the complement of the carry. In the arithmetic addition mode of operation, the circuits correspond to different bit valves proceeding from the lowest order bit to the highest order bit. In the sequence of circuits from the lowest order bit circuit to the highest order bit circuit, the signals representing the carry output terms alternate between a direct carry and the complement of the carry, i.e. whether the carry or the complement of the carry is delivered to the next higher order stage depends upon whether the complement of the carry or the carry is received in the next lower order stage, respectively. If a carry is received from the next lower order stage, the complement of the carry is delivered to the next higher order stage. If the complement of the carry is received from the next lower order stage, the carry is delivered to the next higher order stage. If a carry is to be delivered to the next higher order stage, the delivered carry is the logical sum of the signals on terminals 34 and 38. If the complement of the carry is to be delivered to the next higher order stage, the delivered carry signal is the logical sum of the signals on terminals 34 and 36.

The circuits of FIGURES 1 and 2 operate as a parallel arithmetic adder when all of the control signals ($L_1$, $L_2$, $L_3$) are zero. When control signals $L_1$ and $L_3$ are both applied and $L_2$ is zero, the complement of the logical product $(A_i B_i)'$ appears between the outputs of gates 16 and 14.

With the command signals $L_1$ and $L_2$ applied and the command signal $L_3$ equal to zero, the logical sum $(A_i+B_i)$ appears between the output terminals of gates 16 and 14.

With the command signal $L_1$ applied and the command signals $L_2$ and $L_3$ equal to zero, the non-equivalence function $(A_iB_i'+A_i'B_i)$ appears between the output terminals of gates 16 and 14.

The output signal of gate 10 is:

$$G_i=(A_i'+B_i'+L_2)'=A_iB_iL_2'$$

the output signal of gate 12 is $$K_i=(A_i+B_i+L_3)'=A_i'B_i'L_3'$$

the output signal of gate 18 is $$P_i=(G_i+K_i+P_{i-1}+Q_{i-1}+L_1)'$$
$$P_i=(G_i+K_i)'(P_{i-1}+Q_{i-1})'L_1'$$
$$P_i=(A_iB_iL_2'+A_i'B_i'L_3')'(P_{i-1}+Q_{i-1})'L_1'$$

the output signal of gate 16 is $$R_i=(P_i+G_i+K_i)'=P_i'(G_i+K_i)'$$
$$R_i=[(G_i+K_i)+(P_{i-1}+Q_{i-1})+L_1](G_i+K_i)'$$
$$R_i=(G_i+K_i)'(P_{i-1}+Q_{i-1})+(G_i+K_i)'L_1$$
$$R_i=(A_iB_iL_2'+A_i'B_i'L_3')'(P_{i-1}+Q_{i-1}) +(A_iB_iL_2'+A_i'B_i'L_2'+A_iB_iL_3)'L_1$$

the output signal of gate 14 is $$S_i=(P_i+P_{i-1}+Q_{i-1}+L_1)'=P_i'(P'_{i-1}+Q_{i-1})'L_1'$$
$$S_i=[(G_i+K_i)+(P_{i-1}+Q_{i-1})+L_1](P_{i-1}+Q_{i-1})'L_1'$$
$$S_i=(G_i+K_i)(P_{i-1}+Q_{i-1})'L_1'$$
$$S_i=(A_iB_iL_2'+A_i'B_i'L_3')(P_{i-1}+Q_{i-1})'L_1'$$

For parallel arithmetic addition, the three logic control terms ($L_1=0$, $L_2=0$, $L_3=0$) whence the general equations reduce to:

$$G_i=A_iB_i$$
$$K_i=A_i'B_i'$$

$$P_i=(A_iB_i+A_i'B_i')'(P_{i-1}+Q_{i-1})'$$
$$R_i=(A_iB_i+A_i'B_i')'(P_{i-1}+Q_{i-1})$$
$$S_i=(A_iB_i+A_i'B_i')(P_{i-1}+Q_{i-1})'$$

If the term $(P_{i-1}+Q_{i-1})$ represents the carry from the preceding stage, it may be denoted by $C_{i-1}$:

$$P_i=(A_iB_i+A_i'B_i')'C'_{i-1}$$
$$P_i=(A_iB_i'+A_i'B_i)C'_{i-1}$$
$$P_i=A_iB_i'C'_{i-1}+A_i'B_iC'_{i-1}$$
$$R_i=A_iB_iC_{i-1}+A_i'B_iC_{i-1}$$
$$S_i=A_iB_iC'_{i-1}+A_i'B_i'C'_{i-1}$$

Then, the carry output terminals deliver the complement of the carry to the next higher order stage:

$$P_i+K_i=A_iB_i'C'_{i-1}+A_i'B_iC'_{i-1}+A_i'B_i'$$

and the voltage between the output terminals of gates 16 and 14 is the complement of the partial sum of the two operands.

$$R_i+S_i=A_iB_i'C_{i-1}+A_i'B_iC_{i-1}+A_i'B_i'C'_{i-1}+A_i'B_i'C'_{i-1}$$

If, instead of representing the carry from the preceding stage, the voltage between terminals 30 and 32 represents the complement of the carry, $P_{i-1}+Q_{i-1}=C'_{i-1}$.

$$P_i=(A_iB_i+A_i'B_i')C'_{i-1}$$
$$P_i=A_iB_iC_{i-1}+A_i'B_i'C_{i-1}$$
$$R_i=A_iB_iC'_{i-1}+A_i'B_iC'_{i-1}$$
$$S_i=A_iB_iC_{i-1}+A_i'B_i'C_{i-1}$$

the carry output signal of the stage to the next higher order stage when the carry input to the stage from the next lower order stage is the complement of the carry from that stage is:

$$P_i+G_i=A_iB_i'C_{i-1}+A_i'B_iC_{i-1}+A_iB_i$$

the signal between the outputs of gates 16 and 14 is the partial sum of the two operands $$R_i+S_i=A_iB_i'C'_{i-1}+A_i'B_iC'_{i-1}+A_iB_iC_{i-1}+A_i'B_i'C_{i-1}$$

Thus in the device of FIGURE 2—for example—if $A_0$ equals zero, $A_1=1$, and $A_2=0$, and if $B_0$ equals 1, $B_1=1$, $B_2=0$, the voltage between terminals 46 and 48 would represent a 1, the voltage between terminals 52 and 50 would represent a 1, and the voltage between terminals 54 and 56 would represent a 1. However, the voltage between terminals 50 and 52 would be known to be the complement of the correct bit value, whence the rest of the computer would interpret the 1 between terminals 50 and 52 as a zero, thus giving the correct sum of the two numbers, i.e. 101. The voltage between lines or terminals 34A and 36A would represent a 1, which is the complement of the carry. The voltage between lines or terminals 34B and 36B would be a 1 which is the carry. An overflow signal would be measured between the output terminals of gates 10C and 18C.

When the three logic control terms are $$L_1=1, L_2=0, L_3=1,$$

the general equations reduced to:

$$G_i=A_iB_i$$
$$K_i=0$$
$$P_i=0$$
$$R_i=(A_iB_i)'$$
$$S_i=0$$

thus, the carry is inhibited and the voltage between the output terminals of gates 14 and 16 is a measure of the complement of the logical product of the two operands.

For the combination of control signals $L_1=L$, $L_2=1$, $L_3=0$, the general equations reduce to:

$$G_i=0$$
$$K_i=A_i'B_i'$$
$$P_i=0$$
$$R_i=(A_i'B_i')'=A_i+B_i$$
$$S_i=0$$

thus, the voltage between the output terminals of gates 16 and 14 is a measure of the logical sum of the two operands.

For the control signal combination $L_1=1$, $L_2=0$, $L_3=0$ the general equations reduce to:

$$G_i=A_iB_i$$
$$K_i=A_i'B_i'$$
$$P_i=0$$
$$R=_i(A_iB_i+A_i'B_i')'=A_iB_i'+A_i'B_i$$
$$S_i=0$$

thus, the voltage between the output terminals of gates 16 and 14 are a measure of the non-equivalence function of the two operands.

It is to be noted that should it be desired to cause the signal $R_0+S_0$ of FIG. 2 to be the complement of the lowest order bit of the arithmetic sum of the two operands, that a constant carry into gates 14A and 18A would be needed; line or terminal 36A would be connected to the output terminal of gate 10A instead of the output terminal of gate 12A; and line or terminal 36B would be connected to the output terminal of gate 12B instead of the output terminal of gate 10B.

Thus, the device of this invention is a unique logic circuit using five inverting gates in each bit position and is adapted controllably to be used as a rapid parallel adder, means for generating the complement of the logic product, means for generating the logical sum, and means for generating the non-equivalence function of two operands.

Although the device of this invention has been described in detail above, it is not intended that the invention should be limited by that description, but only in accordance with the spirit and scope of the appended claims.

We claim:

1. In combination:

first, second, third, fourth, and fifth inverting gates;

the output terminal of said first gate being connected to an input terminal of said fourth and an input terminal of said fifth gates;

the output terminal of said second gate being connected to an input terminal of said fourth and an input terminal of said fifth gates;

the output terminal of said fifth gate being connected to an input terminal of said third and an input terminal of said fourth gates;

a first control terminal, connected to an input terminal of said third, and an input terminal of said fifth gates;

a second control terminal, connected to an input terminal of said first gate;

a third control terminal, connected to an input terminal of said second gate;

an input terminal of said second gate being adapted to receive a signal corresponding to a predetermined bit of a first operand;

an input terminal of said second gate being adapted to receive a signal corresponding to a predetermined bit of a second operand;

an input terminal of said first gate being adapted to receive a signal corresponding to the complement of said bit of said first operand;

an input terminal of said first gate being adapted to receive a signal corresponding to the complement of said bit of said second operand;

a first carry input terminal, adapted to receive a signal corresponding to a carry bit, connected to an input terminal of said third gate and to an input terminal of said fifth gate;

a second carry input terminal, adapted to receive a second signal corresponding to a second carry bit, connected to an input terminal of said third and an input terminal of said fifth gates.

2. A logic circuit according to claim 1 in which said inverting gates are NOR gates.

3. In combination:

a plurality of logic circuits equal in number to the number of bits in first and second operands, each of said logic circuits comprising, first, second, third, fourth, and fifth inverting gates, input terminal of said fourth and an input terminal of said fifth gates, the output terminal of said second gate being connected to an input terminal of said fourth and an input terminal of said fifth gates, the output terminal of said fifth gate being connected to an input terminal of said third and an input terminal of said fourth gates, a first control terminal, connected to an input terminal of said third, and an input terminall of said fiflth gates, a second control terminal, connected to an input terminal of said first gate, a third control terminal, connected to an input terminal of said second gate, an input terminal of said second gate being adapted to receive a signal corresponding to a predetermined bit of said first operand, an input terminal of said second gate being adapted to receive a signal corresponding to a predetermined bit of said second operand, an input terminal of said first gate being adapted to receive a signal corresponding to the complement of said bit of said first operand, an input terminal of said first gate being adapted to receive a signal corresponding to the complement of said bit of said second operand, a first carry input terminal, adapted to receive a signal corresponding to a carry bit, connected to an input terminal of said third gate and to an input terminal of said fifth gate, a second carry input terminal, adapted to receive a second signal corresponding to said carry bit, connected to an input terminal of said third and an input terminal of said fifth gate;

said control terminals being connected to the corresponding gates of each of said logic circuits, said logic circuits being connected in ascending order from the said logic circuit corresponding to the lowest order bit of said operands to the said logic circuit corresponding to the highest order bit of said operands as follows:

the said carry input terminals of the said logic circuit corresponding to the lowest order bit of said operands being disconnected;

the output terminal of said fifth gate of each said logic circuits, except said logic circuit corresponding to the highest order bit of said operands, being connected to the said first carry input terminal of the said logic circuit corresponding to the next successive higher order bit of said operands;

the output terminal of said second gate of each of said logic circuits corresponding to odd numbered bits of said operands, except the said logic circuit corresponding to the highest order bit of said operands, being connected to the said second carry input terminal of the said logic circuit corresponding to the next higher order bit of said operands;

the output of said first gate of each of said logic circuits corresponding to the even numbered bits of said operands, except the said logic circuit corresponding to the highest order bit of said operands, being connected to the said second carry input terminal of the said logic circuit corresponding to the next higher order bit of said operands.

4. A device according to claim 3 in which said inverting gates are NOR gates.

5. A device as recited in claim 3 and further comprising: a first control terminal, connected to a separate input terminal of each of said third and fifth gates; a second control terminal, connected to a separate input terminal of each of said first gates; a third control terminal, connected to a separate input terminal of each of said second gates.

6. A device as recited in claim 3 in which the output terminals of said first and second inverting gates are interchanged, and in which a constant carry input signal is applied to said third and fifth gates of said logic circuit corresponding to said lowest order bit.

7. A device as recited in claim 6 and further comprising: a first control terminal, connected to a separate input terminal of each of said third and fifth gates; a second control terminal, connected to a separate input terminal of each of said first gates; a third control terminal, connected to a separate input terminal of each of said second gates.

8. A device according to claim 6 in which said inverting gates are NOR gates.

9. A device as recited in claim 3 and further comprising:

means for generating, in parallel, signals corresponding to the bits of said first operand and signals corresponding to the bits of the complement of said first operand, said signals corresponding to the bits of said first operand each being connected to the said input terminal of said second gate of each of the corresponding said logic circuits, and the said signals corresponding to the complement of said first operand each being connected to the said input terminal of said first gate of each of the corresponding said devices;

means for generating, in parallel, signals corresponding to the bits of said second operand and signals corresponding to the bits of the complement of said second operand, said signals corresponding to the bits of said second operand each being connected to the said input terminal of the said second gate of each of the corresponding said logic circuits, and the said signals corresponding to the complement of said second operand each being connected to the said input terminal of said first gate of each of the corresponding said logic circuits.

10. A device as recited in claim 9 in which the output terminals of said first and second inverting gates are interchanged, and in which a constant carry input signal is applied to said third and fifth gates of said logic circuit corresponding to said lowest order bit.

11. A device as recited in claim 10 in which said means for generating signals corresponding to the bits of said first operand and its complement is a flip-flop register and in which said means for generating signals corresponding to the bits of said second operand and its complement is a second flip-flop register.

12. A device as recited in claim 10 and further comprising:

a first control terminal, connected to a separate input terminal of each of said third and fifth gates;

a second control terminal, connected to a separate input terminal of each of said first gates;

a third control terminal, connected to a separate input terminal of each of said second gates; and control means for applying control signals simultaneously to said first and third control terminals to produce the complement of the logical product of said operands, for applying control signals simultaneously to said first and second control terminals to produce the logical sum of said operands, and for applying a control signal to said first control terminal to produce a non-equivalence function of said operands.

13. A device according to claim 10 in which said inverting gates are NOR gates.

14. A device as recited in claim 9 in which said means for generating signals corresponding to the bits of said first operand and its complement is a flip-flop register and in which said means for generating signals corresponding to the bits of said second operand and its complement is a second flip-flop register.

15. A device according to claim 14 in which said inverting gates are NOR gates.

16. A device as recited in claim 9 and further comprising: a first control terminal, connected to a separate input terminal of each of said third and fifth gates; a second circuit terminal, connected to a separate input terminal of each of said first gates; a third control terminal, connected to a separate input terminal of each of said second gates; and control means for applying control signals simultaneously to said first and third control terminals to produce the complement of the logical product of said operands, for applying control signals simultaneously to said first and second control terminals to produce the logical sum of said operands, and for applying a control signal to said first control terminal to produce a non-equivalence function of said operands.

17. A device according to claim 9 in which said inverting gates are NOR gates.

18. In a parallel adder circuit, having a plurality of adder logic circuits, each of said logic circuits being adapted to receive signals corresponding to one bit order of two operands, each of said logic circuits being assigned to a different order bit and being adapted to receive a signal corresponding to a carry from said logic circuit corresponding to the next lower order bit, and to deliver a signal corresponding to a carry to said logic circuit corresponding to the next higher order bit, the improvement comprising:

said logic circuits, which correspond to even numbered bits, are adapted to receive signals in form complementary to the form of signals adapted to be received by said logic circuits which correspond to odd numbered bits; and each of said logic circuits, except that which corresponds to the highest order bit, are connected to deliver carry signals to the said logic circuit which corresponds to its next higher order bit, in form complementary to the signals received by said delivering logic circuit.

References Cited

UNITED STATES PATENTS

| | | | |
|---|---|---|---|
| 3,138,703 | 6/1964 | Maley | 235—176 XR |
| 3,201,574 | 8/1965 | Szekely | 235—175 |

MALCOLM A. MORRISON, *Primary Examiner.*

V. SIBER, *Assistant Examiner.*